(12) United States Patent
Choi et al.

(10) Patent No.: US 8,200,484 B2
(45) Date of Patent: Jun. 12, 2012

(54) ELIMINATION OF CROSS-CHANNEL INTERFERENCE AND MULTI-CHANNEL SOURCE SEPARATION BY USING AN INTERFERENCE ELIMINATION COEFFICIENT BASED ON A SOURCE SIGNAL ABSENCE PROBABILITY

(75) Inventors: Changkyu Choi, Seoul (KR); Giljin Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1376 days.

(21) Appl. No.: 11/202,025

(22) Filed: Aug. 12, 2005

(65) Prior Publication Data

US 2006/0034361 A1 Feb. 16, 2006

(30) Foreign Application Priority Data

Aug. 14, 2004 (KR) ........................ 10-2004-0064117

(51) Int. Cl.
*G10L 21/02* (2006.01)
*G10L 11/02* (2006.01)
(52) U.S. Cl. ........................................ 704/228; 704/233
(58) Field of Classification Search ........................ None
See application file for complete search history.

(56) References Cited

U.S. PATENT DOCUMENTS 6,167,417 A 12/2000 Parra et al.

OTHER PUBLICATIONS

Robert A. Monzingo and Thomas W. Miller, Introduction to Adaptive Arrays, John Wiley & Sons, Inc., 1980, p. 166-168 and 216.*
J. E. Hudson, "Adaptive Array Principles", Peter Peregrinus Ltd, London, UK, on behalf of the Institution of Electrical Engineers, 1981.*
B. Widrow and S. D. Stearns "Adaptive Signal Processing", Prentice-Hall, 1985.*
S. Haykin, "Adaptive Signal Processing", Prentice-Hall, 1985.*
S. Unnikrishna Pillai, "Array Signal Processsing", Springer-Verlag, New York, 1989.*
Korean Society of Phonetic Sciences and Speech Technology Magazine 'Speech', vol. 48, pp. 81-91, 2003.
Mukai et al., "Robust Real-Time Blind Source Separation for Moving Speakers in a Room", NTT Corporation, Kyoto, Japan, ICASSP 2003 IEEE, pp. 469-472 (In English).
Visser et al., "Application of Blind Source Separation in Speech Processing for Combined Interference Removal and Robust Speaker Detection Using a Two-Microphone Setup", Institute for Neural Computation, ICA2003, San Diego, CA, pp. 325-329 (in English).

* cited by examiner

*Primary Examiner* — Talivaldis Ivars Smits
(74) *Attorney, Agent, or Firm* — Staas & Halsey LLP (57) ABSTRACT

Cross-channel interference is eliminated and multi-channel sources are separated by estimating a source absence probability for a current frame of a first channel output, and determining an interference elimination coefficient for matching a secondary signal of the first channel output with a primary signal of a second channel output by using the source absence probability, generating an interference signal by multiplying the second channel output by an over-subtraction factor and the interference elimination coefficient, wherein a partial differentiation is performed for a v-norm value of a spectral amplitude difference, between the first channel output and the second channel output multiplied by the interference elimination coefficient and a result of multiplication of the source absence probability, by using the interference elimination coefficient to determine an update amount of the interference elimination coefficient for a next frame.

21 Claims, 5 Drawing Sheets

ELIMINATION OF CROSS-CHANNEL INTERFERENCE AND MULTI-CHANNEL SOURCE SEPARATION BY USING AN INTERFERENCE ELIMINATION COEFFICIENT BASED ON A SOURCE SIGNAL ABSENCE PROBABILITY

CROSS-REFERENCE TO RELATED APPLICATION

This application claims the priority of Korean Patent Application No. 2004-0064117, filed on Aug. 14, 2004, in the Korean Intellectual Property Office, the disclosure of which is incorporated herein by reference.

BACKGROUND OF THE INVENTION

1. Field of the Invention

The present invention relates to a source separation, and more particularly, to a method of and an apparatus for eliminating cross-channel interference, and a multi-channel source separation method and a multi-channel source separation apparatus using the same.

2. Description of Related Art

A source signal separation has been increasingly used in a variety of fields such as communication systems, a biological signal processing, and a speech signal processing. Blind source separation (BSS) refers to a method of separating an original source signal by using a difference between input signals of each microphone without a priori knowledge of those signals when mixtures of input signals are input to a plurality of microphones. A typical BSS method shows a satisfactory performance in an ideal environment simulated in a laboratory, but performs poorly in a real environment. This is because the BSS method postulates limiting the length of filtering due to use of a convolutive mixing filter as a linear finite impulse response filter. Unfortunately, real signals do not follow such a postulation because non-linear electrical noises can be added or the sound sources can be moved during collecting the microphone signals.

In order to solve such a problem, a spectral subtraction has been used as a post-processing for eliminating remaining crosstalk signals that have not been completely eliminated by a conventional BBS method. Spectral subtraction is advantageous in that inconsistency between a real filter and an estimated filter can be effectively eliminated, so that a clear signal without noises or interference can be generated. However, a musical noise still remains due to spectral components below zero.

Recently, there have been several documents disclosing the BSS method, such as U.S. Pat. No. 6,167,417. Also, documents relating to a post-processing after the BSS have been disclosed in, for example, "Application of blind source separation in speech processing for combined interference removal and robust speaker detection using a two-microphone setup" (USCD & Softmax, in Proceedings of ICA2003, pages 325-329) by Erik Visser and Te-Won Lee, and "Robust real-time blind source separation for moving speakers in a room" (NTT Corporation, Kyoto, Japan, in Proceedings of ICASSP2003, Vol. V, pages 469-472) by Ryo Mukai et. al.

BRIEF SUMMARY

An aspect of the present invention provides a method of and an apparatus for eliminating cross-channel interference by updating an interference elimination coefficient based on a source signal absence probability.

Also, an aspect of the present invention provides a multi-channel source separation apparatus and a multi-channel source separation method, by which the cross-channel interference is eliminated and the original source signal can be clearly separated by using an interference elimination coefficient updated based on a source signal absence probability.

According to an aspect of the present invention, there is provided an apparatus for eliminating cross-channel interference, comprising: a source absence probability estimating unit estimating a source absence probability for a current frame of a first channel output; an elimination coefficient determining unit determining an interference elimination coefficient for matching a secondary signal of the first channel output with a primary signal of a second channel output by using the source absence probability; an interference signal generating unit generating an interference signal by multiplying the second channel output by an over-subtraction factor and the interference elimination coefficient; and an interference eliminating unit eliminating the cross-channel interference from the first channel output by using the interference signal.

According to another aspect of the present invention, there is provided a method of eliminating cross-channel interference, comprising: estimating a source absence probability for a current frame of a first channel output; determining an interference elimination coefficient for matching a secondary signal of the first channel output with a primary signal of a second channel output by using the source absence probability; generating an interference signal by multiplying the second channel output by an over-subtraction factor and the interference elimination coefficient; and eliminating cross-channel interference from the first channel output by using the interference signal.

According to still another aspect of the present invention, there is provided a multi-channel source separation apparatus comprising: a source signal separation unit separating multi-channel source signals from a mixture including the multi-channel source signals; and a post-processing unit eliminating cross-channel interference from a first channel output of the separated multi-channel source signals by using an interference elimination coefficient determined based on a degree of interference between the first channel output and a second channel output of the separated multi-channel source signals.

According to still another aspect of the present invention, there is provided a multi-channel source separation method comprising: separating multi-channel source signals from a mixture including the multi-channel source signals; and eliminating cross-channel interference from a first channel output of the separated multi-channel source signals by using an interference elimination coefficient determined based on a degree of interference between the first channel output and a second channel output of the separated multi-channel source signals.

According to still other aspects of the present invention, there are provided computer-readable storage media encoded with processing instructions for causing a processor to perform the aforementioned methods of the present invention.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
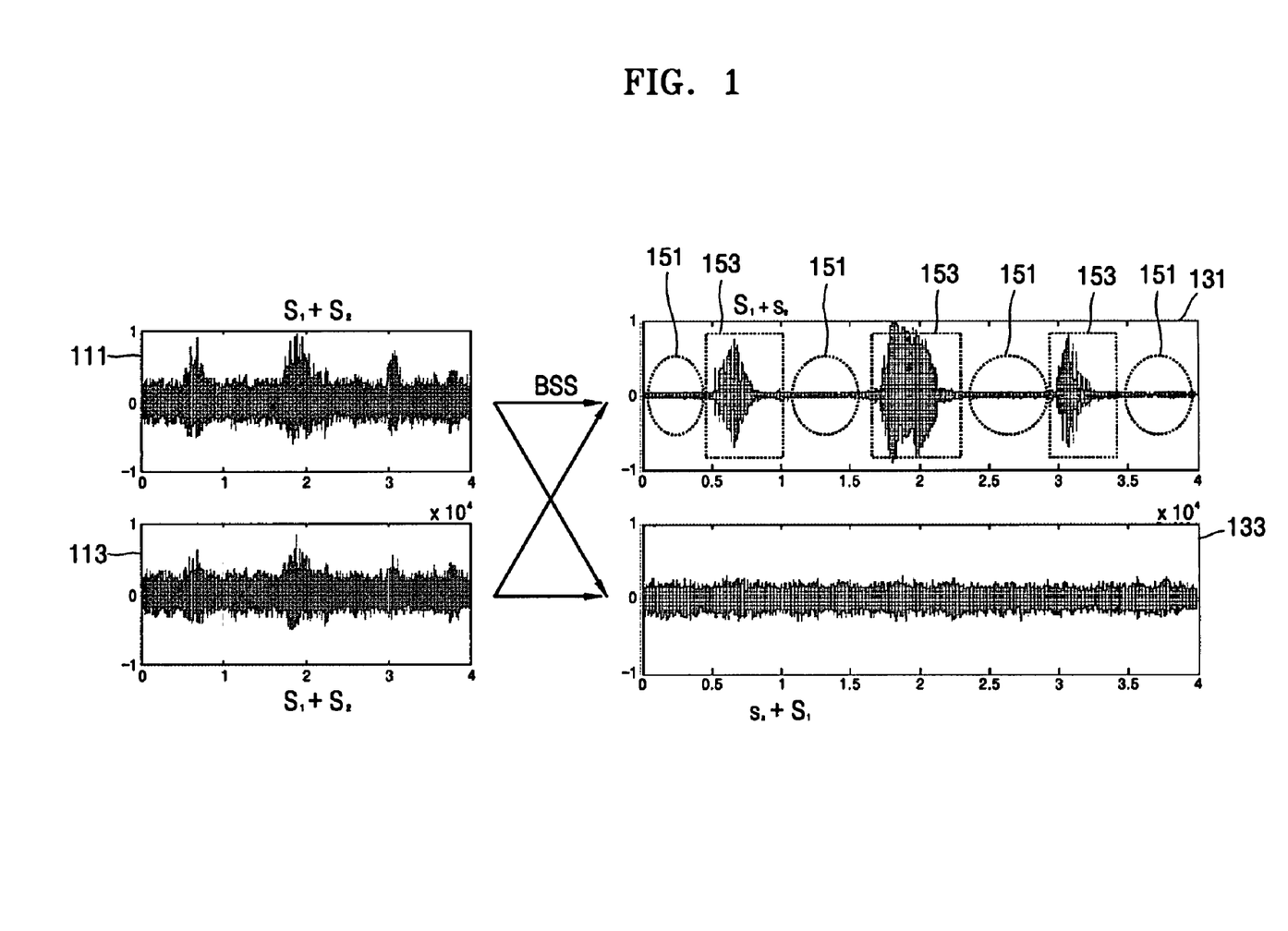
FIG. 1 illustrates waveforms for describing a principle of a source separation according to the present invention.

FIG. 1 illustrates waveforms for describing a principle of a source separation according to an embodiment of the present invention. In FIG. 1, it is assumed that, for example, two source signals are mixed (i.e., two channels are used). $S_1$ and $S_2$ denote original source signals. When two microphones are used, waveforms 111 and 113 depict mixtures (i.e., $S_1+S_2$) input to each of the two microphones, respectively. Waveforms 131 and 133 depict first and second channel signals $S_1+s_2$ and $s_1+S_2$, respectively, as a result of applying a source separation algorithm such as a blind source separation (BSS) to the mixtures, where capital letters designate primary source signals and small letters designate secondary source signals. Meanwhile, the first channel signal 131 has only the secondary source signal $s_2$ in a first section 151. However, there are the primary source signal $S_1$ as well as the secondary source signal $s_2$ in a second section 153. As shown in FIG. 1, the waveforms after the source separation have the secondary source signal as well as the primary source signal due to inherent separation errors.

According to an embodiment of the present invention, in order to appropriately separate the secondary source signal from each channel output after the source separation, a source absence probability is used to distinguish sections where, for example, the primary source signal $S_1$ exists in the first channel signal 131 and other sections where the primary source signal $S_1$ does not exist. Based on the source absence probability, an interference elimination coefficient is determined. Then, the interference elimination coefficient is multiplied by the second channel signal 133, and then a spectral subtraction or a Wiener filtering between the result of the multiplication and the first channel signal 131 is performed. As a result, only the primary source signal $S_1$ remains in the first channel signal 131.

Figure 2:
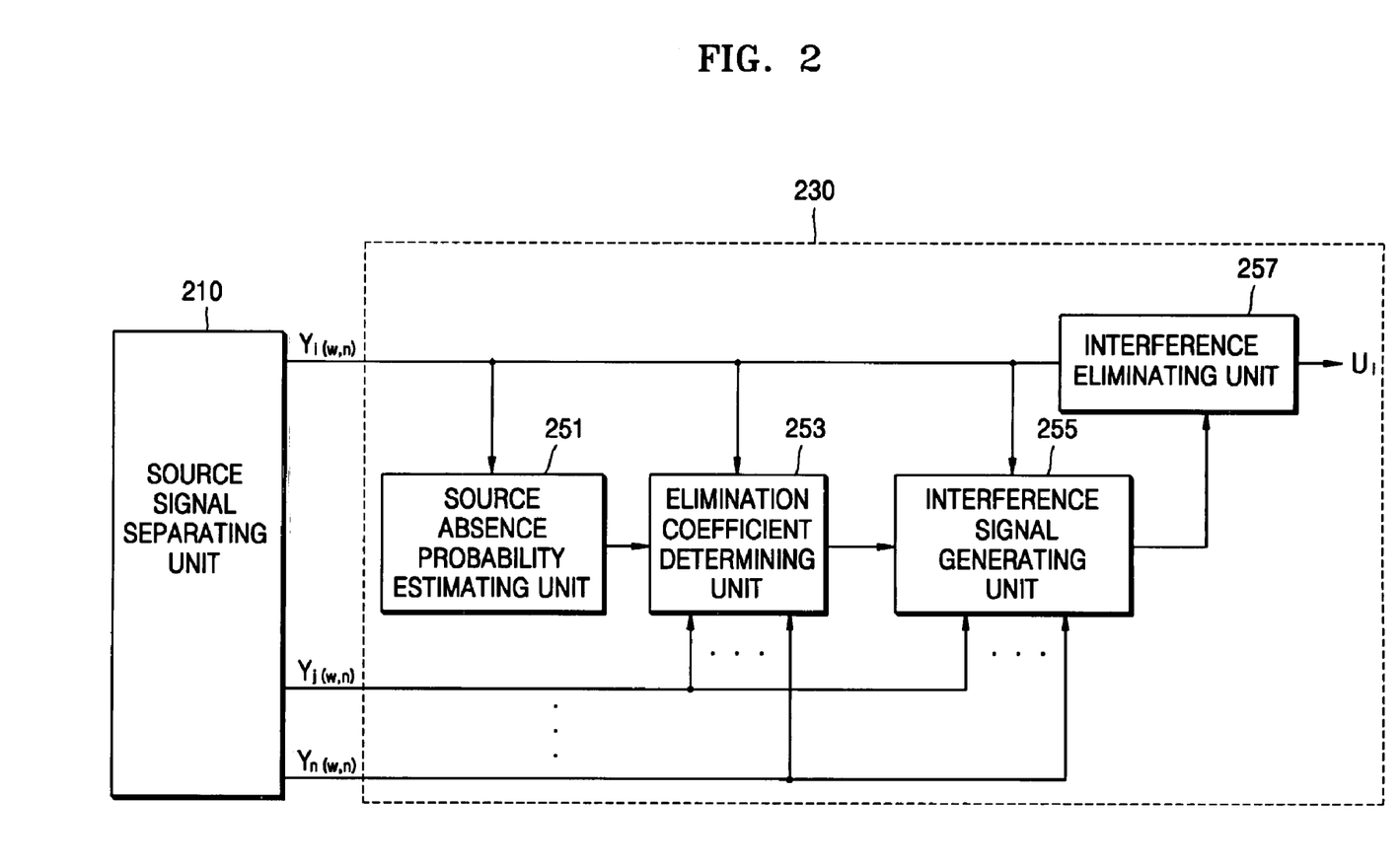
FIG. 2 is a block diagram illustrating a source separation apparatus according to an embodiment of the present invention.

FIG. 2 is a block diagram illustrating a source separation apparatus according to an embodiment of the present invention, which includes a source signal separating unit 210 and a post-processing unit 230. The post-processing unit 230 includes a source absence probability estimating unit 251, an elimination coefficient determining unit 253, an interference signal generating unit 255, and an interference eliminating unit 257. In FIG. 2, for simplicity of explanation, only one channel output is shown in the post-processing unit 230. However, it is to be understood that the same configuration can be implemented for each of the other channels.

Referring to FIG. 2, the source signal separating unit 210 separates a multi-channel source signal from mixtures including the multi-channel source signal. The mixtures are measured by each of a plurality of microphones. Now, operation of the source separating unit 210 will be described in detail by exemplifying a convolutive blind source separation (CBSS) algorithm based on an independent component analysis (ICA).

First, in a real recording environment using a plurality of microphones, i.e., sensors, each source signal is transmitted toward a forward direction and then reaches each microphone via direct paths and reverberant paths. The signals measured in a j-th microphone can be represented by the following equation:

$$x_j(t) = \sum_{i=1}^{N} \sum_{\tau=0}^{\infty} h_{ji}(\tau) s_i(t-\tau) + n_j(t) \qquad \text{[Equation 1]}$$
$$= \sum_{i=1}^{N} h_{ji}(t) * s_i(t) + n_j(t),$$

where $s_i(t)$ denotes an i-th source signal, N denotes the number of sources, $x_j(t)$ denotes a measured signal, $h_{ji}(t)$ denotes a transfer function of a path from an i-th source to a j-th sensor, i.e., microphone, * denotes a convolution operator, and a noise term $n_j(t)$ is a non-linear distortion component (i.e., a white noise) caused by a recorder's inherent characteristic.

On the other hand, since a convolutive mixture in a time domain corresponds to an instantaneous mixture in a frequency domain, conversion between the time domain and the frequency domain can be easily performed. For convenience of description, it is assumed that a stereo input and a stereo output are used. If a short time Fourier transform is applied, Equation 1 can be rewritten as the following equation:

$$X(\omega,n) = H(\omega) S(\omega,n) + N(\omega,n), \qquad \text{[Equation 2]}$$

where $\omega$ denotes a frequency bin, n denotes a frame index, $X(\omega,n)$ denotes a measured signal in a frequency bin $\omega$ of a frame n, $S(\omega,n)$ denotes a source signal in a frequency bin $\omega$ of a frame n, and $H(\omega)$ denotes a mixing matrix. Further, $X(\omega,n)$ can be expressed as $[X_a(\omega,n)\ X_2(\omega,n)]^T$. Here, $X_j(\omega,n)$ can be expressed as $$\sum_{\tau=0}^{T-1} e^{-i2\pi\omega\tau/T} x_j(t_n + \tau),$$

which corresponds to a result of a discrete Fourier transform for a frame having a size of T with a shift length $$\left\lfloor \frac{T}{2} \right\rfloor \text{ from } t_n = \left\lfloor \frac{T}{2} \right\rfloor (n-1) + 1.$$

Also, $\lfloor \bullet \rfloor$ denotes a flooring operator. This representation can be similarly applied to $S(\omega,n)$ and $N(\omega,n)$.

A process for separating the original source signal $S(\omega,n)$ from the measured signal $X(\omega,n)$ represented by Equation 2 can be expressed as follows:

$$Y(\omega,n) = W(\omega) X(\omega,n), \qquad \text{[Equation 3]}$$

where $Y(\omega,n)$ denotes an estimate of the original source signal $S(\omega,n)$ when influences of a noise term $N(\omega,n)$ are ignored. In addition, W(ω) denotes a unmixing matrix. $Y_i(ω, n)$ and $Y_j(ω,n)$ are determined independently with each other.

In order to compute the unmixing matrix W(ω), an optimization algorithm based on an information maximization can be used. According to this algorithm, a step increment ΔW of the unmixing matrix W(ω) can be expressed as follows:

$$\Delta W \propto [\phi(Y)Y^H - diag(\phi(Y)Y^H)], \quad \text{[Equation 4]}$$

where H denotes a Hermitian transpose operator, $\phi(\cdot)$ denotes a polar coordinate based non-linear function and can be defined as $\phi(Y)=[Y_1/|Y_1| Y_2/|Y_2|]^T$.

The post-processing unit 230 eliminates cross-channel interference from the separated multi-channel source signal provided from the source signal separating unit 210, by using the determined elimination coefficient based on a source signal presence probability, i.e., a primary signal presence probability, of the current channel output.

In the post-processing unit 230, the source absence probability estimating unit 251 establishes a primary signal hypothesis and a secondary signal hypothesis in the unit of a frame with respect to the current channel output, and obtains the primary signal absence probability by using the hypotheses. The obtained primary signal absence probability is used to determine the interference elimination coefficient.

The primary presence probability represents a degree of existence of the primary signal in the current channel output, and can be obtained by using a Bayesian rule. This theory is discussed in detail.

For each frame of the i-th channel output provided from the source signal separating unit 210, all frequency bins ($Y_i(n)$) of a frame can be expressed as $Y_i(n)=\{Y_i(ω,n)|ω=1, \ldots, T\}$, and the hypotheses $H_{i,0}$ and $H_{i,1}$ can be used to represent a state of presence or absence of each primary signal. Accordingly, they can be defined as follows:

$$H_{i,0}: Y_i(n)=\tilde{S}_j(n)$$

$$H_{i,1}: Y_i(n)=\tilde{S}_i(n)+\tilde{S}_j(n), i \neq j \quad \text{[Equation 5]}$$

where $\tilde{S}_i$ denotes a result of filtering the source signal $S_i$.

Based on the Bayesian rule and a complex Gaussian distribution, posteriori probabilities of the hypotheses for $Y_i(n)$ can be obtained by using the following equation:

$$p(H_{i,m}|Y_i(n)) = \frac{p(Y_i(n)|H_{i,m})p(H_{i,m})}{p(Y_i(n)|H_{i,0})p(H_{i,0}) + p(Y_i(n)|H_{i,1})p(H_{i,1})}, \quad \text{[Equation 6]}$$

where i denotes a source index, m is set to 0 for the secondary signal model, and m is set to 1 for the primary signal model. In addition, $p(H_{i,0})$ denotes a priori probability for absence of an i-th source signal, and $p(H_{i,1})$ denotes a priori probability for presence of the i-th source signal. In this case, it is assumed that $p(H_{i,1})=1-p(H_{i,0})$. In Equation 6, $p(H_{i,0}|Y_i(n))$ represents a probability that only the secondary signal exists in an n-th frame of the i-th channel output, i.e., the primary signal absence probability. Also, $p(H_{i,1}|Y_i(n))$ represents a probability that the primary signal, i.e., a cross-channel interference probability exists in an n-th frame of the i-th channel output.

Assuming each frequency bin is independent, Equation 7 can be defined as follows $$p(Y_i(n)|H_{i,m}) = \prod_\omega p(Y_i(\omega, n)|H_{i,m}). \quad \text{[Equation 7]}$$

As a result, based on Equation 6, the primary signal absence probability $p(H_{i,0}|Y_i(n))$ can be expressed by Equation 8, and the primary signal presence probability $p(H_{i,1}|Y_i(n))$ can be expressed by Equation 9:

$$p(H_{i,0}|Y_i(n)) = \left[1 + \frac{p(H_{i,1})}{p(H_{i,0})}\prod_\omega^T \frac{p(Y_i(\omega,n)|H_{i,1})}{p(Y_i(\omega,n)|H_{i,0})}\right]^{-1} ; \text{and} \quad \text{[Equation 8]}$$

$$p(H_{i,1}|Y_i(n))=1-p(H_{i,0}|Y_i(n)). \quad \text{[Equation 9]}$$

The source absence probability estimating unit 251 estimates and outputs the primary signal absence probability $p(H_{i,0}|Y_i(n))$ obtained by Equation 8 as the source absence probability in an n-th frame of the i-th channel output of the source signal separating unit 210. The source presence probability is determined by the source absence probability as shown in Equation 9.

The elimination coefficient determining unit 253 determines an interference elimination coefficient as an optimal value for matching the magnitude of the secondary signal of the current channel, i.e., an i-th channel with the magnitude of the primary signal of the other channel, i.e., a j-th channel. In this case, an initial value of the interference elimination coefficient $b_{ij}$ can be an arbitrary value, e.g., 0 or 1. Since the algorithm according to the present invention is a sort of adaptive algorithm, even an inaccurate initial value can be converged to an optimal value through iteration.

The interference signal generating unit 255 multiplies an over-subtraction factor and an interference elimination coefficient ($b_{ij}$) between the i-th and j-th channel outputs provided from the elimination coefficient determining unit 253, by the j-th channel output, and then the result of the multiplication is generated as an interference signal to be output.

The interference eliminating unit 257 eliminates the cross-channel interference from the current channel output by using the interference signal provided from the interference signal generating unit 255 to output a clearly separated source signal. In this case, the interference can be eliminated by using a spectral subtraction or a Wiener filtering. The spectral subtraction can be expressed as follows:

$$|U_i(\omega, n)| = \left[f\left(|Y_i(\omega, n)|^a - \alpha_i \sum_{j \neq i} b_{ij}(\omega)|Y_j(\omega, n)|^a\right)\right]^{1/a} \quad \text{[Equation 10]}$$

$$\angle U_i(\omega, n) = \angle Y_i(\omega, n),$$

where a denotes a constant, usually designated as 1 or 2, $\alpha_i$ denotes an over-subtraction factor, and $b_{ij}$ denotes an interference elimination coefficient between the i-th and j-th channel outputs. In addition, $|U_i(\omega,n)|$ and $\angle U_i(\omega,n)$ denote an amplitude and a phase of the source signal finally output from the interference elimination unit 257, respectively. On the other hand, f(•) is a bounding function, and can be expressed as follows:

$$f(a) = \begin{cases} a & \text{if } a \geq \varepsilon \\ \varepsilon & \text{if } a < \varepsilon \end{cases}.$$ [Equation 11]

According to Equation 11, a lower limit of the spectrum of the multi-channel separation signal is determined to be a constant ε. According to the present invention, it is possible to eliminate non-stationary noises varying in a time domain as well as stationary noises by multiplying a different channel signal by an appropriate interference elimination coefficient and the over-subtraction factor when the spectral subtraction is performed, and then subtracting the result of the multiplication from the current channel signal.

On the other hand, the Wiener filtering can be expressed as follows:

$$|U_i(\omega, n)|^a = f\left(|Y_i(\omega, n)|^a - \alpha_i \sum_{j \neq i} b_{ij}(\omega)|Y_j(\omega, n)|^a\right)$$ [Equation 12]

$$= H_i(\omega)|Y_i(\omega, n)|^a$$

$$H_i(\omega) \cong f\left(\frac{|Y_i(\omega, n)|^a - \alpha_i \sum_{j \neq i} b_{ij}(\omega)|Y_j(\omega, n)|^a}{|Y_i(\omega, n)|^a}\right).$$

According to Equation 12, the Wiener filtering can have an effect similar to the spectral subtraction because the subtraction is converted into a multiplication in a frequency domain. The function and the parameters used in Equation 12 are similar to those of Equation 10.

Figure 3:
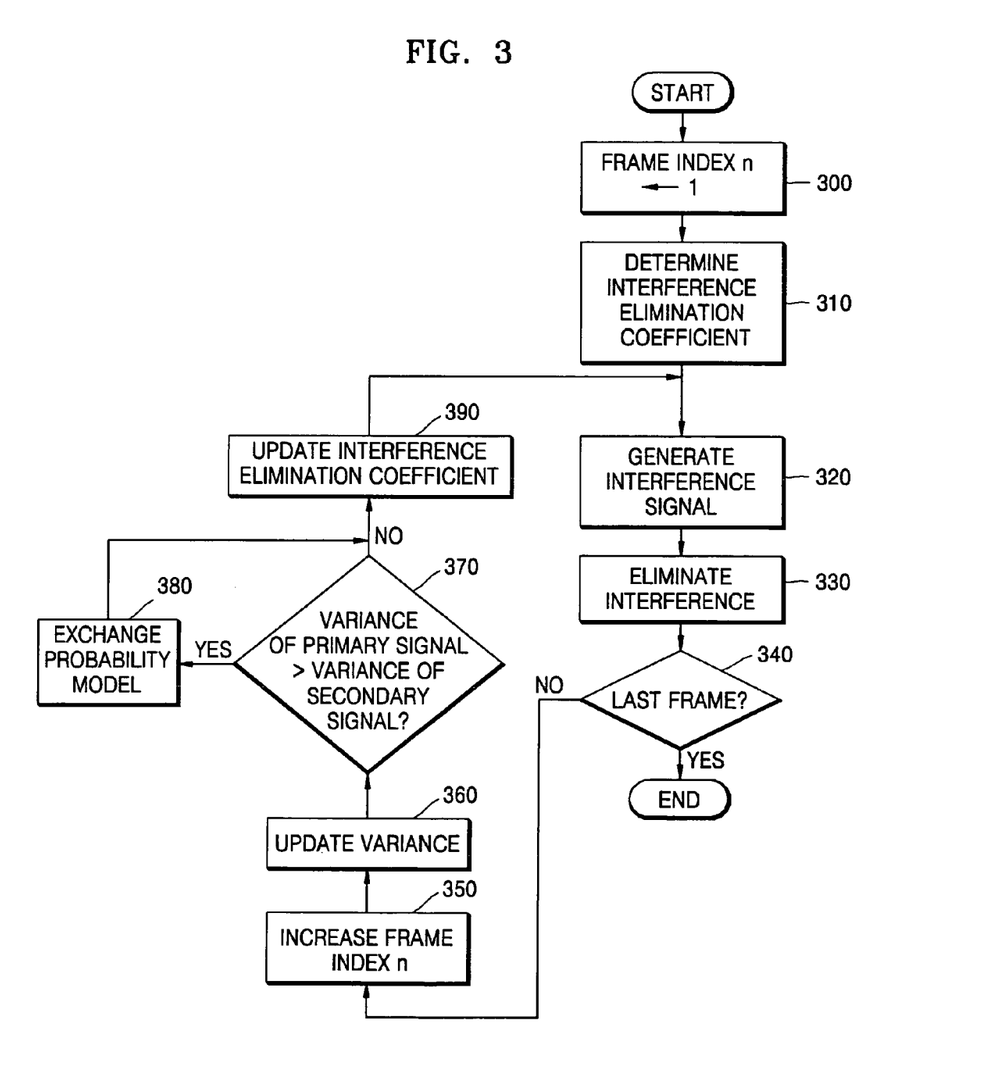
FIG. 3 is a flowchart illustrating a multi-channel source separation method according to another embodiment of the present invention.

FIG. 3 is a flowchart illustrating operation of a multi-channel source separation method according to an embodiment of the present invention.

In operation 300, a frame index n of the current channel output among the multi-channel source signals converted into a frequency domain is initialized to 1. In operation 310, for a first frame (n=1) of the current channel output, the interference elimination coefficient is determined to an arbitrary value.

In operation 320, the interference elimination coefficient determined in operation 310 and an over-subtraction factor are multiplied by a different channel output, so that the interference signal for the first frame of the current channel output is generated. In operation 330, the cross-channel interference is eliminated by subtracting the interference signal generated in operation 320 from the current channel output. In this case, as described above, the Wiener filtering can be used instead of the spectral subtraction.

In operation 340, it is determined whether the current frame is a last frame. If the current frame is the last one, the process is terminated, and otherwise the frame index n is incremented in operation 350.

In operation 360, variances of primary and secondary signals of a next frame are updated by using a spectral amplitude, an adaptive frame rate, a source presence probability, and a source absence probability, for the current frame output with the cross-channel interference eliminated in operation 330.

More specifically, when the cross-channel interference has been successfully removed by the above Equation 10 or 12, the spectral amplitude $|U_i(\omega,n)|$ in the section 151 of FIG. 1 will be zero. For each hypothesis, a posteriori probability of $Y_i(\omega,n)$ can be defined as the following equation by using a complex Gaussian distribution of $|U_i(\omega,n)|$:

$$p(Y_i(\omega, n)|H_{i,m}) \cong p(U_i(\omega, n)|H_{i,m}) \propto \exp\left[-\frac{|U_i(\omega, n)|^2}{\lambda_{i,m}(\omega)}\right],$$ [Equation 13]

where $\lambda_{i,m}(\omega)$ denotes a variance of the current frame output from the interference elimination unit 257, which corresponds to a variance of the primary signal when m=1 or a variance of the secondary signal when m=0.

The variance $\lambda_{i,m}(\omega)$ is updated through a probability averaging process for each frame as shown in Equation 14:

$$\lambda_{i,n} \Leftarrow \{1-\eta_\lambda p(H_{i,m}|Y_i(n))\}\lambda_{i,n}+\eta_\lambda p(H_{i,m}|Y_i(n))|U_i(\omega,n)|^2,$$ [Equation 14]

where a positive constant $\eta_\lambda$ denotes an adaptive frame rate. Typically, since the BSS algorithm will put emphasis on the primary signal, the amplitude of the primary signal will become larger than that of the secondary signal in each channel output. In operation 370, the variances of the primary and secondary signals updated in operation 360 are compared with each other. If the variance of the secondary signal is larger than that of the primary signal, the variances of the complex Gaussian model are swapped for all frequency bins in operation 380.

More specifically, with respect to each channel output, if the variance $\eta_{i,0}$ of the secondary signal is larger than the variance $\eta_{i,1}$ of the primary signal when the variance $\eta_{i,m}(\omega)$ is updated for each frame, i.e., if Equation 15 is satisfied as shown below, the variances of the complex Gaussian model are swapped for all frequency bins.

$$\sum_\omega \lambda_{i,0}(\omega) > \sum_\omega \lambda_{i,1}(\omega)$$ [Equation 15]

In operation 390, the interference elimination coefficient is updated by using the source absence probability as shown in Equation 18, and then operations 320 through 380 are iterated.

Figure 4:
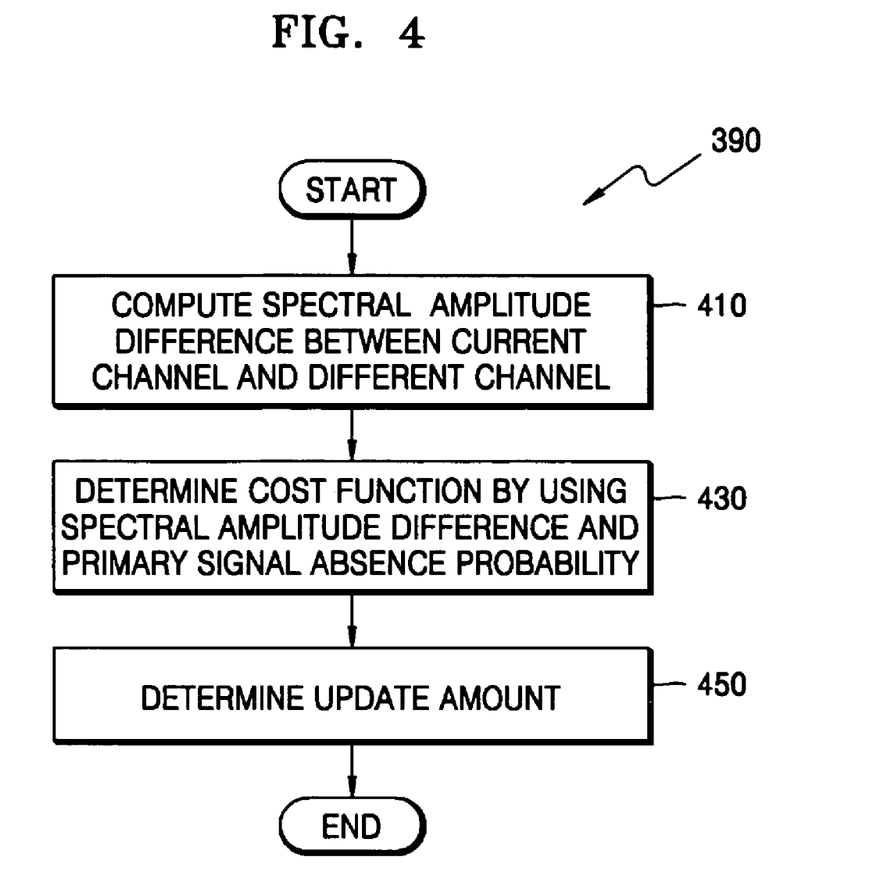
FIG. 4 is a flowchart illustrating operation of updating an interference elimination coefficient of FIG. 3.

FIG. 4 is a flowchart illustrating operation 390 of updating an interference elimination coefficient $b_{ij}$ of FIG. 3.

In operation 410, the spectral amplitude difference between Yi and Yj in every frequency bin ω of an n-th frame is computed as follows:

$$\delta_i(\omega, n) = |Y_i(\omega, n)| - \sum_{j \neq i} b_{ij}(\omega)|Y_j(\omega, n)|.$$ [Equation 16]

In operation 430, the v-norm of the spectral amplitude difference $\delta_i(\omega,n)$ is multiplied by the primary signal absence probability $p(H_{i,0}|Y_i(n))$, and then the result of the multiplication is determined to be a cost function $J(\omega,n)$. Accordingly, the cost function $J(\omega,n)$ can be expressed as follows:

$$J(\omega,n)=p(H_{i,0}|Y_i(n)) \cdot |\delta_i(\omega,n)|^v,$$ [Equation 17]

where the real number v is set to a value smaller than 1, for example, 0.8, for the primary signal presence probability $p(H_{i,1}|Y_i(n))$, and a value larger than 1, for example, 1.5, for the primary signal absence probability $p(H_{i,0}|Y_i(n))$. In this manner, the real number v is differently set for each probability model, so that a method of the present invention is adaptive to a musical noise distribution frequently generated when only the secondary signal exists as shown in the section 151 of FIG. 1. Therefore, it is possible to eliminate common channel noises as well as the cross-channel interference.

In operation 450, the cost function $J(\omega,n)$ of an n-th frame is partially differentiated by the interference elimination coefficient $b_{ij}$, so that an update amount $\Delta b_{ij}(\omega)$ is obtained as shown in Equation 18:

$$\Delta b_{ij}(\omega) \propto -\frac{\partial J(\omega, n)}{\partial b_{ij}(\omega)} = \qquad \text{[Equation 18]}$$

$$p(H_{i,0}|Y_i(n)) \cdot |\delta_i(\omega, n)|^{\nu-1} \cdot Y_j(\omega, n).$$

Therefore, the interference elimination coefficient $b_{ij}$ of a next frame is updated by using the update amount determined in Equation 18. Thus, Equation 18 can be called a gradient descent method because the update is performed toward a minimum of the cost function.

Figure 5:
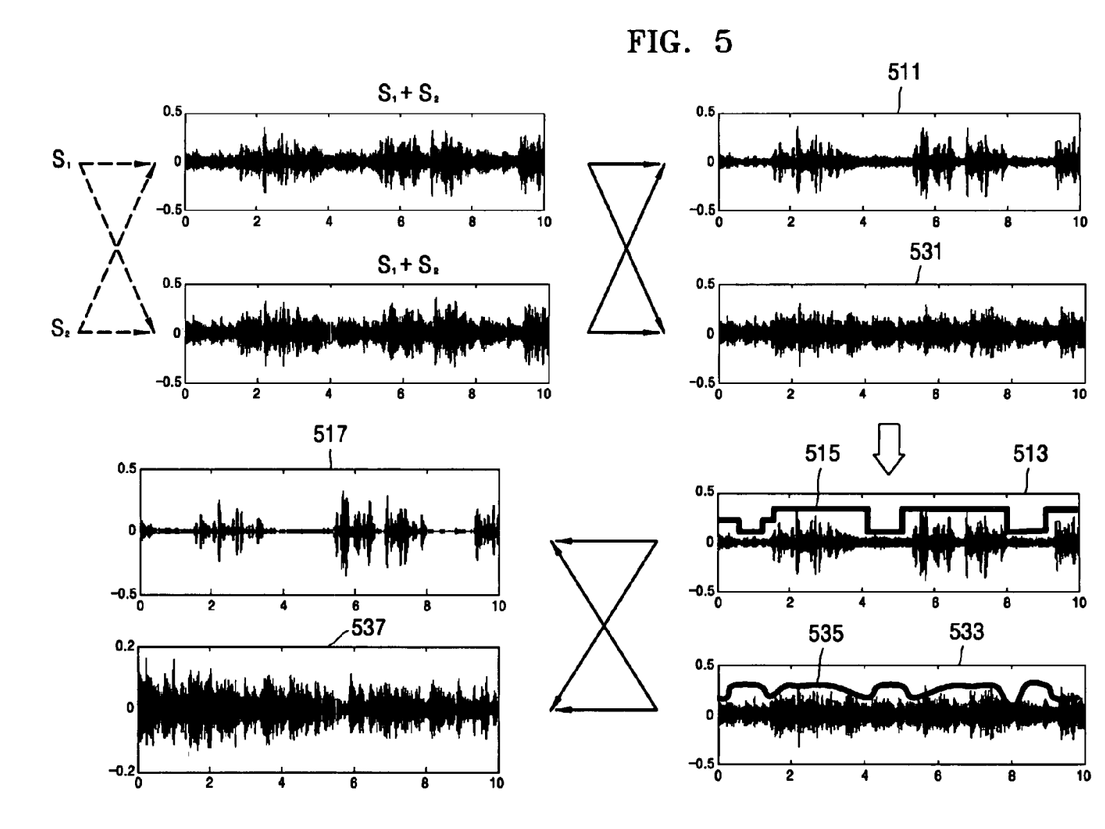
FIG. 5 illustrates waveforms for describing a performance measurement for a source separation method according to the present invention.

FIG. 5 illustrates waveforms for describing a performance measurement for a source separation method according to an embodiment of the present invention.

To measure a performance of a source separation method according to the present invention, data was recorded in a typical office environment. Two speakers were used as sound sources, and two omni-directional microphones were simultaneously used to record mixtures with a sampling frequency of 16 kHz. Also, the environment was designed such that one of a male voice and a female voice was output through a first speaker and five different music sounds was simultaneously output through a second speaker. The voice was composed of a series of vocal sounds speaking a complete sentence, and the music sounds were composed of a pop, a rock, and a light classic, and the like. In addition, a distance between the microphones was set to 50 cm, and a distance between the speakers was set to 50 cm, and a distance between the microphone and the speaker was set to 100 cm. The length of a frame is set to 512 samples.

The result of the source separation can be compared by using a signal-to-noise ratio, and the signal-to-noise ratio can be defined as a logarithm of a ratio of a primary signal power to a secondary signal power in a channel as shown in Equation 22:

$$SIR(u_i)[\text{dB}] = \qquad \text{[Equation 22]}$$

$$10\log_{10}\left[\frac{E_1(u_i)}{E_2(u_i)}\right] \simeq 10\log_{10}\left[\frac{E_{1+2}(u_i) - E_2(u_i)}{E_2(u_i)}\right],$$

where $E_1(u_i)$ and $E_2(u_i)$ denote average powers of a primary signal and a secondary signal included in a signal $u_i$, respectively, and $E_{1+2}(u_i)$ denotes an average power when the cross-channel interference exists. If there is no correlation between the two sources, an approximation, $E_1 \approx E_{1+2} - E_2$, can be given.

Meanwhile, in order to evaluate the signal powers, an interference probability can be used as shown in Equations 23:

$$E_2(u_i) = \frac{\sum_n P(H_{i,0}|Y_i(n))\langle u_i(t)^2\rangle_n}{\sum_n P(H_{i,0}|Y_i(n))} \qquad \text{[Equations 23]}$$

$$E_{1+2}(u_i) = \frac{\sum_n P(H_{i,1}|Y_i(n))\langle u_i(t)^2\rangle_n}{\sum_n P(H_{i,1}|Y_i(n))},$$

where $\langle u_i(t)^2\rangle_n$ denotes an average sample power of an n-th frame.

The following Table 1 shows microphone inputs, BSS outputs, and signal-to-noise ratios resulting from the interference elimination according to the present invention. In Table 1, the signal-to-noise ratios (SIR) are evaluated for the first channel in which voice signals f1 and m1 are used as the primary signals. Here, f1 and f2 denote female's voices, m1 and m2 denote male's voices, and g1 through g3 denote different music sounds. The unit of scalar values is dB.

TABLE 1

| mixture | Input | BSS output | present invention | mixture | Input | BSS output | present invention |
|---------|-------|------------|-------------------|---------|-------|------------|-------------------|
| f1-g1 | 6.37 | 7.13 | 11.04 | m1-g1 | 7.91 | 10.37 | 16.15 |
| f1-g2 | 3.84 | 8.75 | 16.57 | m1-g2 | 4.19 | 8.81 | 16.36 |
| f1-g3 | 1.89 | 5.74 | 11.11 | m1-g3 | 0.87 | 4.84 | 10.97 |
| f1-f2 | 3.08 | 6.45 | 10.90 | m1-f2 | 2.54 | 9.42 | 15.74 |
| f1-m2 | 7.23 | 10.92 | 16.82 | m1-m2 | 6.74 | 11.72 | 17.46 |
| average | 4.48 | 7.80 | 13.29 | average | 4.45 | 9.03 | 15.34 |
| increment | — | +3.32 | +5.49 | increment | — | +4.58 | +6.30 |

Looking into Table 1, it is recognized that the microphone input signals are improved about 4 dB by applying the BSS in a frequency domain, and the outputs of the BSS are further improved about 6 dB by applying an algorithm according to the present embodiment.

Referring to FIG. 5, waveforms 511 through 517 show a process for a first channel, and waveforms 531 through 537 show a process for a second channel. In addition, waveforms 511 and 531 show the mixtures input to each microphone, and waveforms 513 and 533 show the results of applying the BSS to each mixture in a frequency domain. Further, waveforms 515 and 535 show primary signal presence probabilities, and waveforms 517 and 537 show resulting signals in which the cross-channel interference is adaptively eliminated based on the primary signal presence probabilities. Looking into the resulting signals 517 and 537, the cross-channel interference which has remained in the BSS outputs are remarkably eliminated.

Embodiments of the present invention can be applied when each source signal separated from mixtures including a plurality of original source signals input through a plurality of microphones includes a plurality of secondary signals as well as the primary signals due to inconsistency between an actual transfer function and a postulated linear model. For example, embodiments of the present invention can be applied to a post-processing for each source signal separated by using a time and frequency domain convolutive BSS (CBSS), a beamforming method, or a method of using unidirectional microphones, so that common channel noises inherently included in the separated source signals and cross-channel interference can be eliminated. In addition, embodiments of the present invention can be employed in a variety of fields such as performance improvement of a speech recognition system and sound quality improvement of a hearing aid or a speech communication system such as a mobile phone.

Embodiments of the present invention can also be embodied as computer readable codes recorded on a computer readable storage medium. The computer storage recording medium is any data storage device that can store data which can be thereafter read by a computer system. Examples of a computer readable storage medium include read-only memory (ROM), random-access memory (RAM), CD-ROMs, magnetic tapes, floppy disks, optical data storage devices, and carrier waves (such as data transmission through the Internet). The computer readable storage medium can also be distributed over network coupled computer systems so that the computer readable code is stored and executed in a distributed fashion.

According to embodiments of the present invention, it is possible to remarkably eliminate common channel noises and cross-channel noises included in the separated source signals in a non-stationary noise environment as well as a stationary noise environment because the interference elimination coefficient is determined by using source absence probabilities for each frame.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for eliminating cross-channel interference, comprising:
    a source absence probability estimating unit to estimate a source absence probability for a current frame of a first channel output;
    an elimination coefficient determining unit to determine an interference elimination coefficient for matching a secondary signal of the first channel output with a primary signal of a second channel output by using the source absence probability;
    an interference signal generating unit to generate an interference signal by multiplying the second channel output by an over-subtraction factor and the interference elimination coefficient; and
    an interference eliminating unit to eliminate the cross-channel interference from the first channel output by using the interference signal,
    wherein the elimination coefficient determining unit performs a partial differentiation for a v-norm value of a spectral amplitude difference between the first channel output and the second channel output multiplied by the interference elimination coefficient and a result of the multiplication of the source absence probability by using the interference elimination coefficient to determine an update amount of the interference elimination coefficient for a next frame.

2. The apparatus of claim 1, wherein the source absence probability estimating unit determines whether variances of a current complex Gaussian distribution are to be swapped based on a result of a comparison between a variance of a primary signal and a variance of a secondary signal of a next frame, the variances being updated by using a spectral amplitude, a source signal presence probability, and a source absence probability of a current frame whose interference has been eliminated by the interference eliminating unit, and then the complex Gaussian distribution is updated according to the result of the determination of whether variances of a current complex Gaussian distribution are to be swapped.

3. The apparatus of claim 1, wherein the v-norm value is set to a value less than 1 for a voice signal and a value greater than 1 for a noise signal.

4. The apparatus of claim 1, wherein the interference eliminating unit eliminates the cross-channel interference by a spectral subtraction between the first channel output and the interference signal.

5. The apparatus of claim 1, wherein the interference eliminating unit eliminates the cross-channel interference by a Wiener filtering between the first channel output and the interference signal.

6. A method of eliminating cross-channel interference, comprising:
    estimating, performed by at least one processing device, a source absence probability for a current frame of a first channel output;
    determining an interference elimination coefficient for matching a secondary signal of the first channel output with a primary signal of a second channel output by using the source absence probability;
    generating an interference signal by multiplying the second channel output by an over-subtraction factor and the interference elimination coefficient; and
    eliminating cross-channel interference from the first channel output by using the interference signal,
    wherein the determination of the interference elimination coefficient comprises:
    multiplying the source absence probability by a v-norm value of a spectral amplitude difference between the first channel output and the second channel output multiplied by the interference elimination coefficient; and
    performing a partial differentiation for a result of the multiplication by using the interference elimination coefficient to determine an update amount of the interference elimination coefficient for a next frame.

7. The method of claim 6, wherein the estimation of the source absence probability comprises:
    updating variances of primary and secondary signals of a next frame based on a spectral amplitude, a source presence probability, and the source absence probability of a current frame whose cross-channel interference has been eliminated;
    comparing the updated variance of the primary signal with the updated variance of the secondary signal; and
    determining whether variances of a current complex Gaussian distribution are to be swapped based on a result of the comparison and then updating the complex Gaussian distribution according to the result of the determination.

8. The method of claim 6, wherein the v-norm value is set to a value less than 1 for a voice signal and a value greater than 1 for a noise signal.

9. The method of claim 6, wherein the elimination of the cross-channel interference is performed using the following equations:

$$|U_i(\omega, n)| = \left[f\left(|Y_i(\omega, n)|^a - \alpha_i \sum_{j \neq i} b_{ij}(\omega)|Y_j(\omega, n)|^a\right)\right]^{1/a}$$

$$\angle U_i(\omega, n) = \angle Y_i(\omega, n)$$

$$f(a) = \begin{cases} a & \text{if } a \geq \varepsilon \\ \varepsilon & \text{if } a < \varepsilon \end{cases}, \text{ and}$$

wherein a denotes a constant, $\alpha_i$ denotes an over-subtraction factor, $b_{ij}$ denotes an interference elimination coefficient between an i-th channel output $Y_i$ and a j-th channel output $Y_j$, $\omega$ denotes a frequency bin, n denotes a frame index, and $|U_i(\omega,n)|$ and $\angle U_i(\omega,n)$ denote an amplitude and a phase of a frame that the interference has been eliminated, respectively.

10. The method of claim 6, wherein the elimination of the cross-channel interference is performed using the following equations:

$$|U_i(\omega, n)|^a = f\left(|Y_i(\omega, n)|^a - \alpha_i \sum_{j \neq i} b_{ij}(\omega)|Y_j(\omega, n)|^a\right)$$

$$= H_i(\omega)|Y_i(\omega, n)|^a$$

$$H_i(\omega) \cong f\left(\frac{|Y_i(\omega, n)|^a - \alpha_i \sum_{j \neq i} b_{ij}(\omega)|Y_j(\omega, n)|^a}{|Y_i(\omega, n)|^a}\right)$$

$$f(a) = \begin{cases} a & \text{if } a \geq \varepsilon \\ \varepsilon & \text{if } a < \varepsilon \end{cases}, \text{ and}$$

wherein a denotes a constant, $\alpha_i$ denotes an over-subtraction coefficient, $b_{ij}$ denotes an interference elimination coefficient between an i-th channel output $Y_i$ and a j-th channel output $Y_j$, $\omega$ denotes a frequency bin, n denotes a frame index, and $|U_i(\omega,n)|$ and $\angle U_i(\omega,n)$ denote an amplitude and a phase of a frame that the interference has been eliminated, respectively.

11. A multi-channel source separation apparatus comprising:
a source signal separation unit to separate multi-channel source signals from a mixture including the multi-channel source signals; and
a post-processing unit to eliminate cross-channel interference from a first channel output of the separated multi-channel source signals by using an interference elimination coefficient, which is determined based on a degree of interference between the first channel output and a second channel output of the separated multi-channel source signals,
wherein the post-processing unit comprises:
a source absence probability estimating unit to estimate the source absence probability for the current frame of the first channel output;
an elimination coefficient determining unit to determine the interference elimination coefficient for matching a secondary signal of the first channel output with a primary signal of the second channel output by using the source absence probability;
an interference signal generating unit to generate an interference signal by multiplying the second channel output by an over-subtraction factor and the interference elimination coefficient; and
an interference eliminating unit to eliminate the cross-channel interference from the first channel output by using the interference signal, and wherein the elimination coefficient determining unit performs a partial differentiation for a v-norm value of a spectral amplitude difference between the first channel output and the second channel output multiplied by the interference elimination coefficient and a result of the multiplication of the source absence probability by using the interference elimination coefficient to determine an update amount of the interference elimination coefficient for a next frame.

12. The multi-channel source separation apparatus of claim 11, wherein the source absence probability estimating unit determines whether variances of a current complex Gaussian distribution is to be swapped based on a result of comparison between a variance of a primary signal and a variance of a secondary signal of a next frame, the variances being updated by using a spectral amplitude, a source signal presence probability, and a source absence probability of a current frame whose interference has been eliminated by the interference eliminating unit, and then the complex Gaussian distribution is updated according to the result of the determination of whether variances of a current complex Gaussian distribution are to be swapped.

13. The multi-channel source separation apparatus of claim 11, wherein the v-norm value is set to a value less than 1 for a voice signal and a value greater than 1 for a noise signal.

14. The multi-channel source separation apparatus of claim 11, wherein the interference eliminating unit eliminates the cross-channel interference by using a spectral subtraction or a Wiener filtering between the first channel output and the interference signal.

15. A multi-channel source separation method comprising:
separating multi-channel source signals from a mixture including the multi-channel source signals; and
eliminating, performed by at least one processing device, cross-channel interference from a first channel output of the separated multi-channel source signals by using an interference elimination coefficient, which is determined based on a degree of interference between the first channel output and a second channel output of the separated multi-channel source signals,
wherein the elimination of the cross-channel interference comprises:
estimating the source absence probability for the current frame of the first channel output;
determining the interference elimination coefficient for matching a secondary signal of the first channel output with a primary signal of the second channel output by using the source absence probability;
generating an interference signal by multiplying the second channel output by an over-subtraction factor and the interference elimination coefficient; and
eliminating cross-channel interference from the first channel output by using the interference signal, and
wherein the determination of the interference elimination coefficient comprises:
multiplying the source absence probability by a v-norm value of a spectral amplitude difference between the first channel output and the second channel output multiplied by the interference elimination coefficient; and
performing a partial differentiation for a result of the multiplication by using the interference elimination coefficient to determine an update amount of the interference elimination coefficient for a next frame.

16. The multi-channel source separation method of claim 15, wherein the estimation of the source absence probability comprises:

updating variances of primary and secondary signals of a next frame based on a spectral amplitude, a source signal presence probability, and the source absence probability of a current frame whose cross-channel interference has been eliminated;

comparing the updated variance of the primary signal with the updated variance of the secondary signal; and determining whether variances of a current complex Gaussian distribution is to be swapped based on a result of the comparison and then updating the complex Gaussian distribution according to the result of the determination.

17. The multi-channel source separation method of claim 15, wherein the v-norm value is set to a value less than 1 for a voice signal and a value greater than 1 for a noise signal.

18. The multi-channel source separation method of claim 15, wherein the elimination of the cross-channel interference is performed using the following equation:

$$|U_i(\omega, n)| = \left[ f\left( |Y_i(\omega, n)|^a - \alpha_i \sum_{j \neq i} b_{ij}(\omega)|Y_j(\omega, n)|^a \right) \right]^{1/a}$$

$$\angle U_i(\omega, n) = \angle Y_i(\omega, n)$$

$$f(a) = \begin{cases} a & \text{if } a \geq \varepsilon \\ \varepsilon & \text{if } a < \varepsilon \end{cases}, \text{ and}$$

wherein a denotes a constant, $\alpha_i$ denotes an over-subtraction coefficient, $b_{ij}$ denotes an interference elimination coefficient between an i-th channel output $Y_i$ and a j-th channel output $Y_j$, $\Omega$ denotes a frequency bin, n denotes a frame index, and $|U_i(\omega,n)|$ and $\angle U_i(\omega,n)$ denote an amplitude and a phase of a frame that the interference has been eliminated, respectively.

19. The multi-channel source separation method of claim 15, wherein the elimination of the cross-channel interference is performed using the following equation:

$$|U_i(\omega, n)|^a = f\left( |Y_i(\omega, n)|^a - \alpha_i \sum_{j \neq i} b_{ij}(\omega)|Y_j(\omega, n)|^a \right)$$

$$= H_i(\omega)|Y_i(\omega, n)|^a$$

$$H_i(\omega) \cong f\left( \frac{|Y_i(\omega, n)|^a - \alpha_i \sum_{j \neq i} b_{ij}(\omega)|Y_j(\omega, n)|^a}{|Y_i(\omega, n)|^a} \right)$$

$$f(a) = \begin{cases} a & \text{if } a \geq \varepsilon \\ \varepsilon & \text{if } a < \varepsilon \end{cases}, \text{ and}$$

wherein a denotes a constant, $\alpha_i$ denotes an over-subtraction coefficient, $b_{ij}$ denotes an interference elimination coefficient between an i-th channel output $Y_i$ and a j-th channel output $Y_j$, $\omega$ denotes a frequency bin, n denotes a frame index, and $|U_i(\omega,n)|$ and $\angle U_i(\omega,n)$ denote an amplitude and a phase of a frame that the interference has been eliminated, respectively.

20. A non-transitory computer-readable storage medium encoded with processing instructions for causing a processor to execute a method of eliminating cross-channel interference, the method comprising:

estimating a source absence probability for a current frame of a first channel output;

determining an interference elimination coefficient for matching a secondary signal of the first channel output with a primary signal of a second channel output by using the source absence probability;

generating an interference signal by multiplying the second channel output by an over-subtraction factor and the interference elimination coefficient; and eliminating the cross-channel interference from the first channel output by using the interference signal, wherein the elimination coefficient determining unit performs a partial differentiation for a v-norm value of a spectral amplitude difference between the first channel output and the second channel output multiplied by the interference elimination coefficient and a result of the multiplication of the source absence probability by using the interference elimination coefficient to determine an update amount of the interference elimination coefficient for a next frame.

21. A non-transitory computer-readable storage medium encoded with processing instructions for causing a processor to execute a multi-channel source separation method comprising:

separating multi-channel source signals from a mixture including the multi-channel source signals; and eliminating cross-channel interference from a first channel output of the separated multi-channel source signals by using an interference elimination coefficient, which is determined based on a degree of interference between the first channel output and a second channel output of the separated multi-channel source signals, wherein the elimination of the cross-channel interference comprises:

estimating the source absence probability for the current frame of the first channel output;

determining the interference elimination coefficient for matching a secondary signal of the first channel output with a primary signal of the second channel output by using the source absence probability;

generating an interference signal by multiplying the second channel output by an over-subtraction factor and the interference elimination coefficient; and eliminating cross-channel interference from the first channel output by using the interference signal, and wherein the determination of the interference elimination coefficient comprises:

multiplying the source absence probability by a v-norm value of a spectral amplitude difference between the first channel output and the second channel output multiplied by the interference elimination coefficient; and performing a partial differentiation for a result of the multiplication by using the interference elimination coefficient to determine an update amount of the interference elimination coefficient for a next frame.

* * * * *

UNITED STATES PATENT AND TRADEMARK OFFICE
CERTIFICATE OF CORRECTION

PATENT NO. : 8,200,484 B2
APPLICATION NO. : 11/202025
DATED : June 12, 2012
INVENTOR(S) : Changkyu Choi et al.

It is certified that error appears in the above-identified patent and that said Letters Patent is hereby corrected as shown below:

First Page Column 2 (Other Publications) 7, Delete "Processsing"," and insert -- Processing", --, therefor.

Column 15, Line 29 (Approx.), In Claim 18, delete "$\Omega$" and insert -- $\omega$ --, therefor.

Signed and Sealed this
Twenty-eighth Day of August, 2012

David J. Kappos
*Director of the United States Patent and Trademark Office*